US 9,705,421 B2

(12) United States Patent
Wang

(10) Patent No.: US 9,705,421 B2
(45) Date of Patent: Jul. 11, 2017

(54) SELF-EXCITED PUSH-PULL CONVERTER

(75) Inventor: Baojun Wang, Guangzhou (CN)

(73) Assignee: MORNSUN GUANGZHOU SCIENCE & TECHNOLOGY LTD., Guangzhou, Guangdong (CN)

( * ) Notice: Subject to any disclaimer, the term of this patent is extended or adjusted under 35 U.S.C. 154(b) by 28 days.

(21) Appl. No.: 14/128,628

(22) PCT Filed: Jan. 12, 2012

(86) PCT No.: PCT/CN2012/070254
§ 371 (c)(1),
(2), (4) Date: Nov. 26, 2015

(87) PCT Pub. No.: WO2013/010385
PCT Pub. Date: Jan. 24, 2013

(65) Prior Publication Data
US 2016/0211769 A1    Jul. 21, 2016

(30) Foreign Application Priority Data

Jul. 18, 2011    (CN) .......................... 2011 1 0200894

(51) Int. Cl.
*H02M 3/338*    (2006.01)
*H02M 7/538*    (2007.01)
*H02M 7/5383*    (2007.01)

(52) U.S. Cl.
CPC ......... *H02M 7/538* (2013.01); *H02M 3/3384* (2013.01); *H02M 7/53835* (2013.01)

(58) Field of Classification Search
CPC .................................................. H02M 3/3382
USPC ............................................ 363/22, 23, 133
See application file for complete search history.

(56) References Cited

U.S. PATENT DOCUMENTS

| 6,288,913 B1* | 9/2001 | White ................. H02M 3/3372 363/133 |
| 7,554,823 B2* | 6/2009 | Fukumoto ......... H02M 7/53806 363/133 |
| 2004/0240234 A1* | 12/2004 | Toda ................... H02M 3/3372 363/22 |

* cited by examiner

*Primary Examiner* — Jeffrey Sterrett
(74) *Attorney, Agent, or Firm* — Bei & Ocean; George G. Wang

(57) ABSTRACT

A self-excited push-pull converter, where between the bases of the push-pull converter's transistors (TR1, TR2) and the effective power suppler there is provided a constant current source (I1), which provides a constant current to the bases of the transistors. With the working voltage increases, the circuit enters into an operating mode not based on the core-saturation working mode, because the transistors' base current is limited by the constant current source and consequently the transistors' collector current cannot increase.

18 Claims, 11 Drawing Sheets

PRIOT ART

PRIOT ART

FIG. 6 PRIOT ART
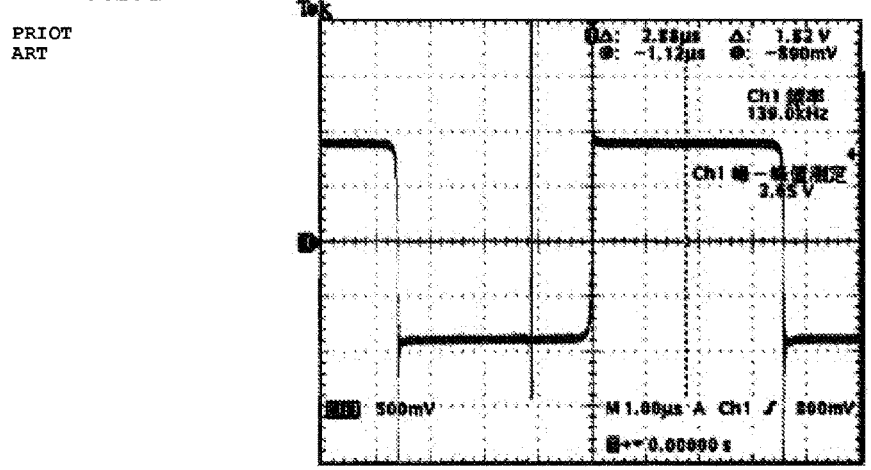
FIG. 7 PRIOT ART
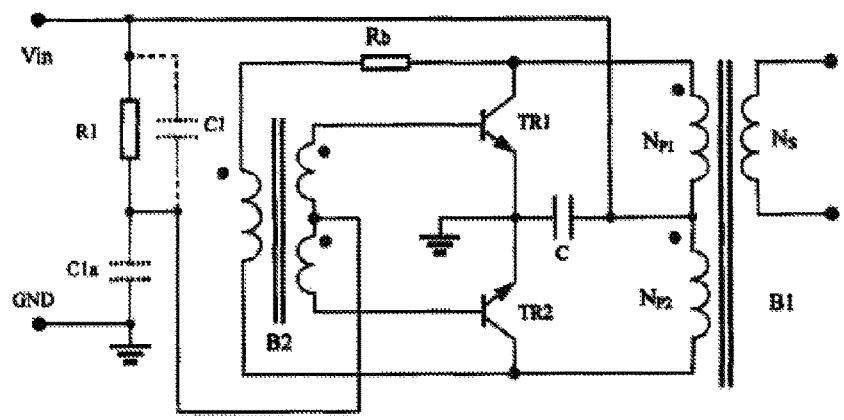
FIG. 8 PRIOT ART
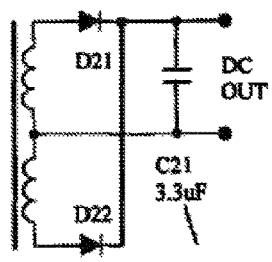

FIG. 12 PRIOT ART
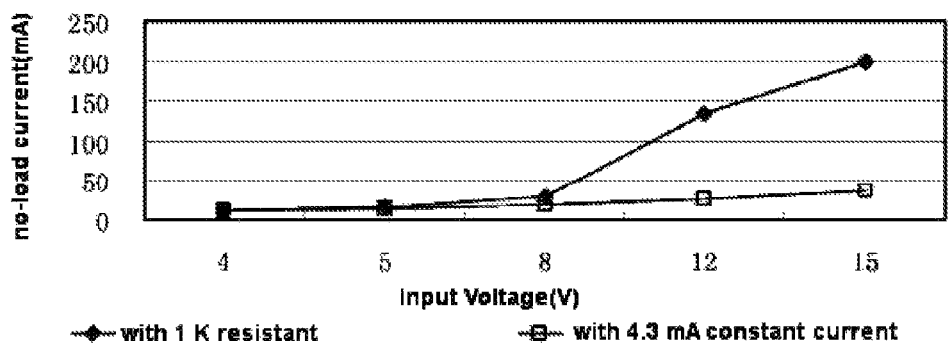
FIG. 13 PRIOT ART
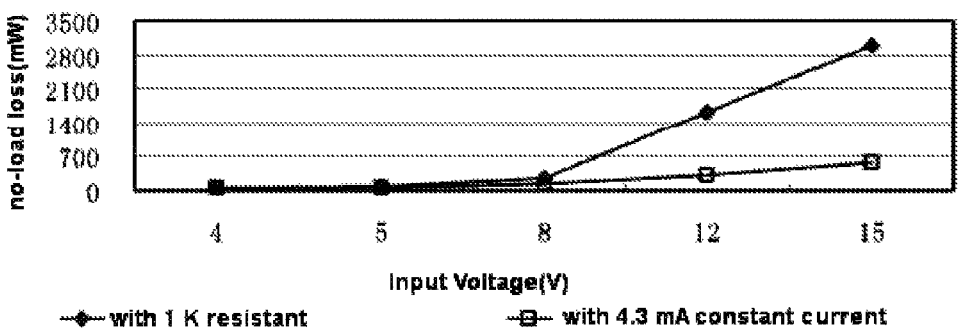
FIG. 14 PRIOT ART
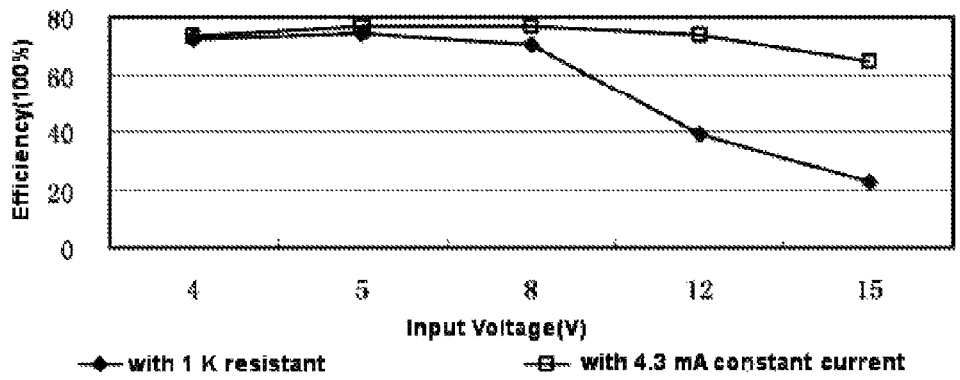

FIG. 21
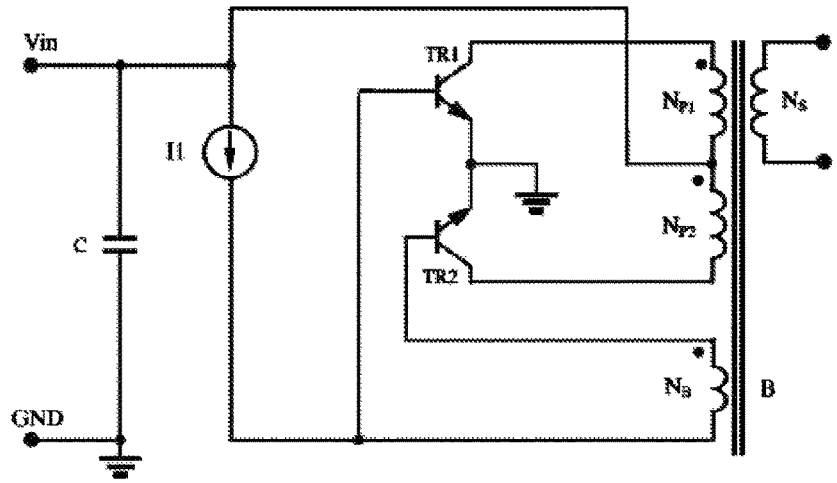
FIG. 22
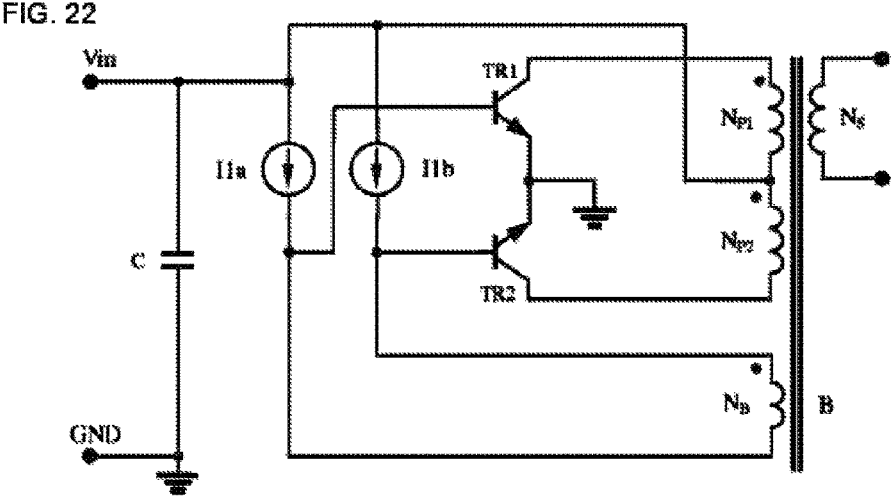
FIG. 23     FIG. 24-1     FIG. 24-2     FIG. 24-3
  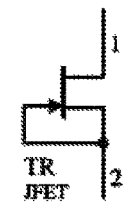 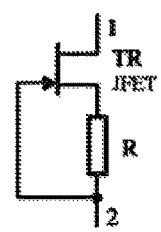

SELF-EXCITED PUSH-PULL CONVERTER

CROSS-REFERENCE TO RELATED APPLICATIONS

This application claims priority from CN Application No. 201110200894.5, filed Jul. 18, 2011 and PCT Application No. PCT/CN2012/070254, filed Jan. 12, 2012, the contents of which are incorporated herein in the entirety by reference.

FIELD OF THE INVENTION

This invention relates to DC-DC or DC-AC converters, particularly those used in industrial control and lighting fields.

BACKGROUND OF THE INVENTION

The circuit structure of existing self-excited push-pull converters is mostly the self-excited oscillation push-pull transistor single-transformer DC converter invented by American G. H. Royer in 1955, which is also the beginning of the application of high-frequency conversion control circuit. Some other push-pull converters may use the self-excited push-pull double-transformer circuit, known as the self-oscillating Jensen circuit invented by American Jen Sen in 1957. These two circuits are collectively called the self-excited push-pull converter which has been described in Page 67 to 70 of "Principle and Design of Switching Power Supply" published by Publishing House of Electronics Industry, ISBN No. 7-121-00211-6. The main forms of the circuits described therein are the Royer circuit and Jensen circuit.

FIG. 1-1 shows a common application of a self-excited push-pull converter based on the Royer circuit structure, where the capacitor C1, parallel connected with bias resistor R1, can be omitted in many situations. Patent No. ZL 03273278.3 titled "A Self-excited Push-pull Converter" published on Aug. 25, 2004, provided a Royer circuit with a soft-start function (see FIG. 2) and thereby solved the problem of the impact caused by capacitance C1 on the push-pull transistors at the instant moment of switching-on.

FIG. 1-2 is also an application of the converter with a Royer circuit structure. What differs from FIG. 1-1 is that the bias resistor R1 is divided into Rlu and Rld in series, which is mostly used in higher operating voltage situations. Similarly, as the capacitor C1 (parallel connected with bias resistor R1) can be omitted in many situations, it is drawn with a dashed line in FIG. 1-2.

FIG. 3 shows a common Royer circuit with a simplified feedback winding and the return circuit of DC signals and the working point of transistors TR1 and TR2 are the same. However, when the circuit is in self-excited oscillation, transistor TR1 and TR2 are working differently. Patent application titled LCD BACKLIGHT DRIVER (Publication No.: US 2007182342 (Al), Publication Date: Aug. 9, 2007) showed a Royer circuit similar to that in FIG. 3 as the unit circuit. FIG. 4 is the original circuit form of FIG. 3. As its main characteristic, FIG. 4 uses two bias resistors Rla and Rlb respectively placed between each base of the push-pull transistors and the effective power supply end. FIG. 3 simplifies it by replacing these two bias resistors with just one and thus realizes a cost-effective solution based on FIG. 4. In patent application titled "Switching Power Supply Apparatus" (Publication No.: US 2006250822 (A1), Publication Date: Nov. 9, 2006), the bias resistors are used in the unit circuit similarly to that in FIG. 4.

FIG. 5 shows a familiar Royer circuit. Due to the inductance L1 in series with the power supply circuit and the capacitor CL parallel connected between the collectors of the push-pull transistors, the circuit output is close to the sine wave, which is commonly used in the electronic rectifier circuit of energy-saving lamps. Also, it may use the simplified method of feedback winding similar to the variation between FIG. 3 and FIG. 4.

The oscillation frequency of the Royer circuit is the function of supply voltage, which has been described in the 18th line of page 68 in the book "Principle and Design of Switching Power Supply" published by Publishing House of Electronics Industry, ISBN No. 7-121-00211-6. It is quoted below:

$$f = \frac{V_S}{4 B_w S N} \times 10^4 \text{ Hz} \qquad \text{Formula 1}$$

In this formula, f refers to the oscillation frequency, Bw is the working magnetic induction (T), N stands for the number of coil turns and S means the effective cross-sectional area of the magnetic core.

The circuit structure in FIG. 1-1: Input filter capacitor C is connected between the input and ground to filter input voltage. The filtered input voltage is connected to the start-up circuit which is composed of bias resistor R1 and capacitor C1 in parallel. C1 can be omitted when the supply voltage input is relatively higher. The two ends of bias resistor R1 are connected with the input voltage and the center tap of primary coils NB1 and NB2 of the coupling transformer B, which provides positive feedback for the bases of two push-pull switching transistors TR1 and TR2, respectively. The emitters of TR1 and TR2 share a common ground and two collectors are respectively connected with the two ends of primary coils NB1 and NB2 of the coupling transformer with which the base is also connected, and the center tap of primary coils NB1 and NB2 is connected to the voltage input end. The secondary coil $N_S$ of coupling transformer B is connected with the output filter circuit in voltage output end.

The working principle can be briefly described as follows: referring to FIG. 1-1, the Royer circuit conducts push-pull oscillation relied on the feature of magnetic core saturation. At the moment when power is on, the parallel circuit of bias resistor R1 and capacitor C1 provides forward bias for the bases and emitters of transistor TR1 and TR2 through coil winding of NB1 and NB2, then two transistors are conducted. Because the properties of transistor cannot be made totally the same, one of them will be conducted first. On the assumption that TR2 is firstly conducted and produces collector current IC2, the upper side of corresponding coil winding of NP2 is positive and lower side negative. According to the dotted terminal relationship, the base coil winding of NB2 also shows an induced voltage positive in the upper and negative in the lower, which increases the base current of TR2. This is a process of positive feedback, thus enabling quick saturation and conduction of TR2. Similarly, the winding voltage of coil corresponding to transistor TR1 is positive in the upper and negative in the lower, which decreases the base current of TR1, causing it to cut off quickly and completely.

The current in the coil winding of NP2 (which is corresponding to TR2) and the magnetic induction produced by the current will increase linearly with time, but when the magnetic induction reaches the value of the core saturation Bm of coupling transformer B, the coil inductance then rapidly decreases, thereby causing a rapid increase in the current of TR2's collector at a speed much higher than that in the base current. Then TR2 is out of saturation and the voltage drop UCE from its collector to its emitter increases. Accordingly, the voltage of winding of transformer NP2 decreases by the same value and the induction voltage of winding of coil NB2 also decreases, causing a drop in the base voltage of TR2 and leading towards the cut-off of TR2. At this moment, the voltage in transformer coil will be reversed and the other transistor (i.e., TR1) will conduct. Now, the above described process will repeat itself to form the push-pull oscillation. The output waveform of winding Ns is shown in FIG. 6.

The characteristic of the above described process: conducting push-pull oscillation based on the properties of core saturation and the output waveform of the coupling transformer is approximately a square wave with a higher conversion efficiency. On the other hand, the circuit in FIG. 5 produces an output waveform close to the sine wave because of the existence of inductance L1 in the power supply circuit and the parallel connected capacitor CL between the two transistors' collectors.

FIG. 7 shows another structure similar to the Royer circuit, where the switch driving function and main power transformer are separated. It is the well-known self-oscillating Jensen circuit. The self-oscillation frequency and driving function of this circuit is realized with a magnetic saturation transformer, thus the main power transformer B1 works in an unsaturation state. In this circuit, only use one capacitor, CI or CIa. CIa is an equivalent to CI, but with CIa the circuit can realize soft starting. It should be noted that the circuit remains operable even if both C1 and CIa are removed.

For the Jensen circuit, even though B2 operates in magnetic saturation, due to its volume, it consumes a very small amount of energy and the overall efficiency of the circuit is high. Compared with the Royer circuit under the same conditions, the Jensen circuit has a comparatively more stable self-oscillation frequency when subject to working voltage, loads and temperatures fluctuations.

For that reason, the Jensen circuit is comparatively more widely used and has various forms, which are mainly reflected in different bias modes of R1 such as the one shown in FIG. 7.

FIGS. 1-7 (except FIG. 6) are all existing self-excited push-pull converters. Their common shortcomings are as follows:

1. Poor adaptability to working voltages.

In the no-load situation, with the increasing working voltage of the circuit, the input current which is equivalent to the quiescent current goes up and causes increased no-load loss of the circuit.

Table 1 lists the measurement result of conducted on the Royer circuit with the following setup: use the circuit shown in FIG. 1-1, set the input at DC 5V, the output at DC 5V, and the output current at 200 mA, that is, an output power of 1 W. The specification of main circuit components is: capacitor C is 1 uF, R1 is 1KΩ, capacitor C1 is 0.047 uF, transistors TR1 and TR2 have an amplification capacity of about 200 folds, and their collectors' maximum operating current is 1 A. The transformer's output circuit is shown in FIG. 8, a common full-wave rectifying circuit.

Throughout the testing process, no parameter of the circuit was readjusted and no part was replaced. For tests with the operating voltage at 12V or greater, the testing period was short because a longer period would cause damages on the circuit due to its large no-load loss.

TABLE 1

| Operating voltage (V) | Input current in no-load (mA) | No-load loss of circuit (mW) | Input current (mA) | Output voltage (V) | Output current (mA) | Circuit conversion efficiency (%) |
|---|---|---|---|---|---|---|
| 3 | 9 | 27 | 183 | 2.768 | 145 | 73.1 |
| 4 | 13 | 52 | 207 | 3.912 | 163 | 77.0 |
| 5 | 18 | 90 | 254 | 5.000 | 200 | 78.7 |
| 8 | 35 | 280 | 269 | 8.494 | 204 | 80.5 |
| 12 | 69 | 828 | 258 | 13.393 | 167 | 72.2 |
| 15 | 90 | 1350 | 225 | 17.238 | 129 | 65.9 |
| 20 | 180 | 3600 | 259 | 23.170 | 131 | 58.6 |

In the test, when the operating voltage was 5V, set the output current at 200 mA. At other operating voltages, the load was adjusted accordingly to make the output current as close to 200 mA as possible, but stop adjusting the load when the output voltage dropped by 5%.

Table 2 lists the measurement results of the Jensen circuit. The tests were conducted using the circuit shown in FIG. 7. The input was set at 5V DC and output 5V DC and 200 mA (i.e., output power 1 W). The specification of main circuit components is: capacitor C is 1 uF, resistor R1 is 1KΩ, capacitor CIa is 0.047 uF, and transistors TR1 and TR2 have an amplification capacity of about 200 folds and their collectors' maximum operating current is 1 A. The transformer's output circuit is shown in FIG. 8.

TABLE 2

| Operating voltage (V) | Input current in no-load (mA) | No-load loss of circuit (mW) | Input current (mA) | Output voltage (V) | Output current (mA) | Circuit conversion efficiency (%) |
|---|---|---|---|---|---|---|
| 4 | 12 | 48 | 82 | 3.742 | 63.2 | 72.1 |
| 5 | 16 | 80 | 112 | 4.871 | 85.6 | 74.5 |
| 8 | 30.4 | 243.2 | 119 | 8.081 | 82.7 | 70.2 |
| 12 | 135 | 1620 | 220 | 12.737 | 80.9 | 39.0 |
| 15 | 200 | 3000 | 256 | 16.060 | 54.1 | 22.6 |

Formula for calculating the conversion efficiency of the circuit is:

$$\eta = \frac{Vout \times Iout}{Vin \times Iin} \times 100\% \qquad \text{Formula 2}$$

Note: Vin=operating voltage, i.e. input voltage, Iin=input current; Vout=output voltage, Iout=output current.

As shown in Table 1, for the circuit with an operating voltage of 5V, when it was working at 8V, the self-loss reached 280 mW, which is barely acceptable for a micropower DC/DC converter. At 12V, the self-loss reached 828 mW, and at 20V 3600 mW (i.e. 3.6 W), under which the circuit would be damaged if operating for over 3 seconds. Thus, the circuit conversion efficiency decreases with increasing operating voltages. The Jensen circuit showed the same problem at elevated operating voltages: the no-load operating current increases too fast, causing higher no-load loss and lower conversion efficiency.

2. Poor performance in surge handling. Based on the above described reasons, when a surge occurs in input voltage, the circuit can be easily damaged, mainly on the transistors.

3. Designs of self-excited push-pull converter in other operating voltages all present the same aforementioned flaws.

SUMMARY OF THE INVENTION

In view of the above described existing problems, the present invention provides the following technical solutions: reducing or eliminating increases in the operating current of the self-excited push-pull converter when the operating voltage increases, and providing the self-excited push-pull converter with a surge-resisting ability to protect the transistors when surge occurs in the input voltage.

To realize the above technical solution, the present invention provides a self-excited push-pull converter characterized in that between the DC circuit of the base of the transistors and the effective power supply end there is a constant current source. In other words, on the basis of a Royer or Jensen circuit structure, a constant current source is used to replace the bias resistor between the base DC circuit of push-pull transistors and the effective power supply end.

The current direction of the constant current source should be the same as that of the replaced bias resistor, that is, from the constant current source to the base of NPN transistors or from the base of PNP transistors to the constant current source.

The constant current source, via a parallel connection, can have a larger current value.

The constant current source can be any semiconductor device or electronic circuit as long as they can provide a constant current.

The working principle of the present invention is as follows. The constant current source takes the place of the original bias resistor with the same current direction. When the operating voltage of the self-excited push-pull converter goes up for whatever reasons, the current provided to the bases of the two push-pull transistors remains constant because of the constant current source is used. Different from the existing convertor where, judged by the collector current of one of the transistors, the current needed for core saturation rapidly increases with increases in the operating voltage, which leads to a rise in no-load loss of the circuit and a drop of conversion efficiency, under the same situation, the convertor according to the present invention, due to use of the constant base current source, will enter into a new working mode to realize push-pull oscillation when the operating voltage increases. The new working mode is described in the following:

Right after the power is on, the constant current source provides forward bias for the bases and emitters of push pull transisters TR1 and TR2 through the feedback windings 1 and 2, and then the two transistors are about to conduct. Because the properties of the two transistors cannot be exactly the same, one of them will be conducted first. Assuming that TR1 is firstly conducted and produces collector current, the corresponding coil winding 1 would be positive in the power supply end and negative in the collector of TR1. According to the dotted terminal relationship, the base feedback winding 1 also shows a positive feedback induced voltage which maintains and increases the base current of TR1. This positive feedback enables a quick saturation and conduction of TR1. In the same time, the induced voltage of base feedback winding 2 decreases the base current of TR2 and cause TR2 quickly and completely cut off. The reduced amount of the base current of TR2 is the increased amount of TR1.

The current in the coil winding corresponding to TR1 and its magnetic induction increase linearly with time. Before the magnetic induction increasing to the core saturation point Bm of coupling transformer B, when collector current of TR1 is close to or reaches the product of its base current and its number of times of amplification, TR1 will be out of the saturation mode and enter into the amplification mode. The voltage drop UCE from the collector to the emitter of TR1 increases significantly. Accordingly, the voltages between the two ends of coil winding 1 (corresponding to TR1) decreases. The base feedback winding 1 also shows a corresponding decrease in the induced voltage, which reduces the base current of TR1. This is a positive feedback process which quickly causes TR1 to get out of the amplification state and enter into the cut-off state. Conversely, the inducted voltage of the base feedback winding 2 helps to increase the base current of TR2 and consequently TR2 is quickly conducted. The base current increase of TR2 comes from the base current decrease of TR1.

In this way, the two transistors are alternately conducted to complete the push-pull oscillation process. Because the total base input current is limited by the constant current source and does not undergo changes with fluctuations of the operating voltage, the circuit turns into a new push-pull oscillation mode when the operating voltage goes up.

The circuit still can, of course, operate based on the core saturation principle to realize push-pull oscillation under normal appropriate load, operating voltage, and other conditions.

The bias resistor with existing technologies provide a larger base current with the rise in the operating voltage, and when the circuit goes into push-pull oscillation based on the core saturation principle, the current of collectors becomes larger and can cause damages on the transistors. In contrast, with the use of constant current source, the circuit turns into a new push-pull oscillation mode in which the maximum current of transistors' collectors is limited by the base current, and the maximum current value is related to the product of the output current of the constant current source and the amplification times of the transistors. This new mode keeps push-pull transistors operating in a safe condition.

The working principle of the invention with the Jensen circuit is similar.

As a further improvement on the above described technical solutions, a synchronous rectification circuit is connected in the output end. As the synchronous rectification is of high efficiency, the loss of voltage drop is reduced with an improved operating efficiency of the circuit. Additionally, linear synchronization between output and input voltages can be realized in a wider input voltage range.

Beneficial Effects

The advantages of this invention are: with the use of a constant current source, at elevated operating voltages, the circuit has a lower no-load power consumption and higher conversion efficiency than existing technologies under the same conditions. The following two sets of actual testing data are presented for illustration.

Using the Royer circuit in FIG. 1-1, set the converter with 5V DC input, 5V DC output and 200 mA output current (i.e., output power 1 W), and use the circuit structure shown in FIG. 8 as the output circuit of the transformer. The main parameters are: capacitor C 1 uF, constant current source 4.3 mA (replacing resistor R1), capacitor CI 0.047 uF, transistors TR1 and TR2 with an about 200 time-amplification capacity and 1 A maximum collector current. The measured data are shown in Table 3.

TABLE 3

| Operating voltage (V) | Input current under no-load (mA) | No-load loss of circuit (mW) | Input current (mA) | Output voltage (V) | Output current (mA) | Circuit conversion efficiency (%) |
|---|---|---|---|---|---|---|
| 3 | 13 | 39 | 183 | 2.853 | 141 | 73.3 |
| 4 | 15 | 60 | 211 | 3.950 | 164 | 76.8 |
| 5 | 17 | 85 | 262 | 4.975 | 207 | 78.6 |
| 8 | 22 | 176 | 259 | 8.467 | 203 | 83.0 |
| 12 | 29 | 348 | 219 | 13.444 | 167 | 85.4 |
| 15 | 30 | 450 | 172 | 17.200 | 132 | 88.0 |
| 20 | 30 | 600 | 218 | 23.000 | 163 | 86.0 |

Comparing Table 3 and Table 1, it can be seen that the self-excited push-pull Royer converter of the present invention, in contrast with the existing self-excited push-pull Royer converter, showed significant improvements in terms of no-load input current, no-load loss and conversion efficiency when the operating voltage was increased.

1. Under the same operating voltage, the circuit of the present invention showed a significant drop in no-load current. Taking a 20V operating voltage as an example, the current under existing technologies is 180 mA and it rapidly increases to over 300 mA after a few seconds in operation, while the current of the present invention is 30 mA and it was very stable for a long period in operation. See comparison shown in FIG. 9.

2. Under the same operating voltage, the circuit of the present invention showed a significant reduction in no-load loss. For example, at 20V operating voltage, it was 360 mW and 600 mW for the existing technology and the present invention, respectively. See comparison shown in FIG. 10.

3. Under the same operating voltage, the circuit of the present invention showed an increase in conversion efficiency. For example, at 20V operating voltage, it is 58.6% and 86.0% for the existing technology and the present invention, respectively. See comparison shown in FIG. 11.

In an another example, the present invention was applied to the circuit of FIG. 7, setting input 5V DC, output 5V DC, and output current 200 mA, i.e., output power 1 W. The main parameters are: 1 uF capacitor C, 4.3 mA constant current source (replacing resistor R1), 0.047 uF capacitor Cla, and transistors TR1 and TR2 with about a 200 time amplification capacity and 1 A maximum collector operating current, and the circuit shown in FIG. 8 as the output circuit of the transformer. The measured parameters are shown in Table 4.

TABLE 4

| Operating voltage (V) | Input current under no-load (mA) | No-load loss of circuit (mW) | Input current (mA) | Output voltage (V) | Output current (mA) | Circuit conversion efficiency (%) |
|---|---|---|---|---|---|---|
| 4 | 12.4 | 49.6 | 96.5 | 3.741 | 75.8 | 73.5 |
| 5 | 14 | 70 | 125.4 | 4.827 | 99.4 | 76.5 |
| 8 | 19.2 | 153.6 | 109.3 | 8.119 | 82.4 | 76.5 |
| 12 | 26.5 | 318 | 112.7 | 12.716 | 78.4 | 73.7 |
| 15 | 37 | 555 | 102.4 | 16.065 | 61.8 | 64.6 |

By comparing Table 4 with Table 2, it can be seen that the self-excited push-pull Jensen converter of the present invention showed a significant improvement in terms of no-load input current, no-load loss and conversion efficiency at elevated operating voltages when compared with the existing self-excited push-pull Jensen converter.

1. Under the same operating voltage, the circuit in this invention presents a significant drop of no-load current. Taking a 15V operating voltage condition as the example, the current under existing technologies was 200 mA and it rapidly increased to over 300 mA after a few seconds in operation; while the current in the circuit of this invention was 37 mA and it was very stable in operation for a long-time. See comparison shown in FIG. 12.

2. Under the same operating voltage, the circuit of the present invention showed a significant reduction in no-load loss. For example, at 15V operating voltage, it was 3000 mW and 555 mW for the existing technology and the present invention, respectively. See comparison shown in FIG. 13.

3. Under the same operating voltage, the circuit of the present invention showed an increase in conversion efficiency. For example, at 15V operating voltage, it was 22.6% and 64.6% for the existing technology and the present invention, respectively. See comparison shown in FIG. 14.

Other Beneficial Effects (I)

Another advantage of the present invention is that with the use of a constant current source as the bias of the self-excited push-pull Royer converter, the circuit protection is improved significantly when it is operating at elevated voltages and the output is short-circuited (i.e. DC OUT in FIG. 8 is short-circuited). Table 5 presents the actual test data conducted using the Royer circuit structure shown in FIG. 1-1.

TABLE 5

| Circuit | Existing technologies (1K resistor bias) | | This invention (4.3 mA constant current source offset) | |
|---|---|---|---|---|
| operating voltage | No-load current (mA) | Total input current in short-circuit (mA) | No-load current (mA) | Total input current in short-circuit (mA) |
| 3 | 9 | 44 | 13 | 57 |
| 4 | 13 | 52 | 15 | 56 |
| 5 | 18 | 60 | 17 | 55 |
| 8 | 35 | 80 | 22 | 59 |
| 12 | 69 | 120 | 29 | 15 |
| 15 | 90 | Push-pull triodes are instantly burned | 30 | 14 |
| 20 | 180 | Push-pull triodes are instantly burned | 30 | 12 |

For the prior art Royer circuit, when load short-circuit occurred, the operating voltage rose, its operating current also rose accordingly. When the operating voltage reached 15V or greater, the push-pull transistors were instantly burned. After replacing the damaged transistors with new ones of the same model and changing the circuit according to the present invention, the test was repeated. It was found that when the load short-circuited at an elevated voltage, the overall input current was decreased. See comparison shown in FIG. 15.

The significant improvement of short-circuit protection performance observed above with the use of the 4.3 mA constant current source is related to the new operating push-pull oscillation mode brought about by the present invention. For the existing prior art Royer self-excited push-pull converter, the short-circuit protection mechanism is based on the leakage inductance of the transformer.

Leakage inductance necessarily exists in all transformers (as no transformer is perfect). The leakage inductance occurs because not all magnetic lines produced in the primary coils can pass through the secondary coils, thus producing magnetic leakage or leakage inductance. The secondary coils are usually on the output side, and when direct short-circuit occurs in the secondary coils, inductance can be detected in the primary coils, which is approximately regarded as the leakage inductance. Referring to the prior art Royer self-excited push-pull converter in FIG. 1-1, when the load short-circuits, that is, equivalently the inductance in NP1 and NP2 decreases to a very small value and the circuit enters into a mode of high frequency self-excitation push-pull oscillation. With reference to formula (1), when the load short-circuits, the product of SN diminishes and the operating frequency goes up. With the rise in the operating voltage, the base current supplied by resistance R1 undergoes linear increasing. Thus, more energy is needed for the circuit to maintain oscillation and for the magnetic core to reach saturation. Consequently, the total input current of the circuit, i.e. the operating current, increases when the load short-circuits.

In contrast, according to the present invention, the circuit turns into a new push-pull oscillation mode. When the load short-circuits and the circuit enters into high frequency self-excitation push-pull oscillation, the push-pull oscillation state is maintained not by the rapid increase in the collector current of the transistors when reaching core saturation but by forcing the transistors to enter into the amplification mode because the fixed base current does not allow the collector current to increase. In this way, the energy consumption needed for core saturation does not increase. Between the turns of winding coils in the transformer, there exists distributed capacitance, to which the equivalent circuit is presented in FIG. 16 (showing the well known schematic diagram of equivalent circuit to all actual inductance). The resistance of RO is small, and so is the capacitance of CO. Thus, CO may be ignored when operating in low frequencies. However, when the load short-circuits and the circuit turns into high frequency self-excitation push-pull oscillation, which can be now represented by the standard LC loop shown in FIG. 16 where the oscillation energy is resonant and the oscillation waveform is approximately the sine wave. The reason it is not the perfect sine wave is due to the high frequency of oscillation and low transmission efficiency of the transformer and the peek value is affected by short-circuit in the output. The approximate sine wave energy of the oscillation is resonant within the primary coils of the transformer, thus the energy consumption is small, which is demonstrated in the input, i.e. the drop of total operating current. FIG. 17 is the measured high frequency oscillation diagram which is close to the sine wave when short-circuit occurs (for measurement, two coil turns added to the transformer as the test points). The top of the peek is not very smooth and there some degree of damping and attenuation, a typical phenomenon caused by the output short-circuit. When load short-circuit occurs with the circuit of the present invention at 12 V operating voltage, the measured total operating current 15 mA, and a total energy consumption 180 mW, as shown in Table 5. In contrast, under the same condition with the prior art circuit, the measurements was 120 mA and 1440 mW, respectively.

Though this invention presents no advantage under the low voltage condition, the total energy consumption would not exceed the consumption of one transistor and can cause no damages to the circuit. In other words, the self-excited push-pull Royer converter according to the present invention provides better short-circuit protection.

Other Beneficial Effects (II)

This invention has another advantage in that linear synchronization between output and input voltages can be realized for a comparatively wider input voltage range when the output uses a synchronous rectification circuit.

With the circuit structure of the present invention which uses a constant current source as the bias, and choosing the output circuit shown in FIG. 8 as the output circuit but using a synchronous rectification circuit to replace diodes D21 and D22, the output voltage is found almost equal to the input voltage. Using the Royer circuit of FIG. 1-1 for comparison, the measured comparative data are shown in Table 6.

TABLE 6

| Circuit | Existing technologies (1K resistor bias) | | This invention (4.3 mA constant current source offset) | |
|---|---|---|---|---|
| operating voltage (V) | Output voltage (V) | Output current (mA) | Output voltage (V) | Output current (mA) |
| 3 | 2.768 | 145 | 2.88 | 145 |
| 4 | 3.912 | 163 | 3.92 | 163 |
| 5 | 5.000 | 200 | 4.97 | 200 |
| 8 | 8.494 | 204 | 7.84 | 204 |
| 12 | 13.393 | 167 | 11.87 | 167 |
| 15 | 17.238 | 129 | 14.85 | 129 |
| 20 | 23.170 | 131 | 19.86 | 131 |

Under the same operating conditions, the output voltage was measured with the same load current. To more clearly show the contrast, the ratio of output voltage to input voltage is separately listed below in Table 7.

TABLE 7

| Circuit | Existing technologies (1K resistor bias) | | This invention (4.3 mA constant current source offset) | |
|---|---|---|---|---|
| operating voltage (V) | Output voltage (V) | Ratio of output/ input voltage | Output voltage (V) | Ratio of output/ input voltage |
| 3 | 2.768 | 0.923 | 2.89 | 0.963 |
| 4 | 3.912 | 0.978 | 3.92 | 0.980 |
| 5 | 5.000 | 1.00 | 4.97 | 0.994 |
| 8 | 8.494 | 1.062 | 7.84 | 0.980 |
| 12 | 13.393 | 1.116 | 11.87 | 0.989 |
| 15 | 17.238 | 1.149 | 14.85 | 0.988 |
| 20 | 23.170 | 1.159 | 19.86 | 0.993 |

With the use of synchronous rectification, as the voltage drop is far less than that caused by diodes D21 and D22, the turns of output winding of the output transformer are reduced, making it hard to find an appropriate turns to obtain an exact 5.00V output voltage. In the end, only a 4.97V output voltage was found in the measurement.

With the existing technologies, the Royer circuit operating voltage at 20V will receive a loss up to 3600 mW, as shown in Table 1, which means the circuit cannot work at 20V even though the synchronous rectification technique is used for linear synchronization of output voltage. With this invention, as shown in Table 3, the circuit has a no-load current of 30 mA and a loss of 600 mW at 20V operating voltage and it can work as usual. That is, this invention has solved the problem of poor adaptability of operating voltage so that linear synchronization technology can be put into practical uses.

As shown in Table 7, within 3V-20V operating voltages, the output precision is −7.7%~15.9% with existing technologies, while it is stabilized in the −3.7%~−0.7% range for the present invention.

For both the tests, the connection shown in FIG. 18 were used in which RL is a variable load for effectively reducing measurement error. The ammeters and voltmeters used were MASTECH® MY65 digital multimeters (having three measurement modes: 200 mA, 20V and 200V), and 4 or more multimeters were used simultaneously when necessary.

With MY65 digital multimeters, the internal resistance is 10 MΩ in the voltage measurement modes and 1Ω in the 200 mA measurement mode. When the measurement current exceeded 200 mA, two ammeters in parallel connection were used and the sum of the readings from both ammeters was taken. Such parallel measurement is a mature technology recognized in the art.

$V_1$ voltage meter shows operating voltage $V_{in}$, i.e., the input voltage; $A_1$ current meter shows input current $I_{in}$, i.e. the operating current; $V_2$ voltage meter shows output voltage Vout, and $A_2$ current meter shows output current $I_{out}$; the conversion efficiency can be obtained from Formula (2).

BRIEF DESCRIPTION OF THE DRAWINGS

FIG. 1-2 is circuit schematic diagram of another common application of the Royer circuit in a self-excited push-pull converter.

FIG. 2 is a Royer circuit with a soft start function published in CN Patent No. 03273278. 3.

FIG. 6 is the output waveform of the Ns winding in FIG. 1-1.

FIG. 7 is a schematic diagram of a common application of the Jensen circuit in a self-excited push-pull converter.

FIG. 8 is a well known full-wave rectifying circuit.

FIG. 12 shows the input current comparison of a 5V-5V Royer circuit under different bias modes.

FIG. 13 shows the no-load loss comparison of a 5V-5V Jensen circuit under different bias modes.

FIG. 14 shows the conversion efficiency comparison of a 5V-5V Jensen circuit under different bias modes.

FIG. 21 is the circuit drawing of the third exemplary embodiment of the present invention.

FIG. 22 is the circuit drawing of the fourth exemplary embodiment of the present invention.

FIG. 23 is the symbol for the constant current source in the circuit drawings.

FIG. 24-1 is the schematic diagram of a constant current source constructed by constant current diodes.

FIG. 24-2 is a schematic diagram of a constant current source constructed by a JFET (junction field effect transistor).

FIG. 24-3 is a schematic diagram of another constant current source constructed by a JFET.

FIG. 24-4 is a schematic diagram of a constant current source constructed by a bipolar PNP transistor.

FIG. 24-5 is a schematic diagram of a constant current source constructed by another bipolar PNP transistor.

FIG. 24-6 is a schematic diagram of a constant current source constructed by TL431 precision adjustable reference IC;

FIG. 24-7 is a schematic diagram of a constant current source constructed by LM317 voltage regulator IC.

DETAILED DESCRIPTION OF PARTICULAR EMBODIMENTS OF THE INVENTION

Figure 1:
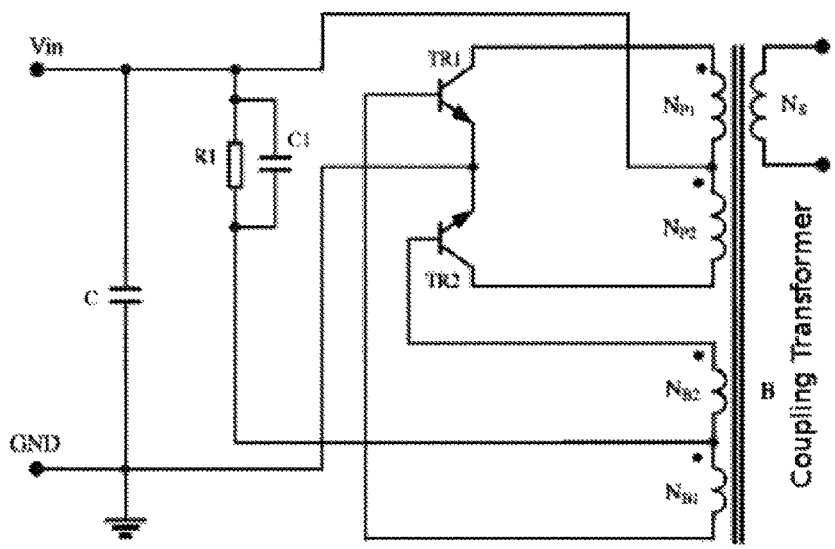
FIG. 1-1 is a circuit schematic diagram of a common application of the Royer circuit in a self-excited push-pull converter.
Figure 19:
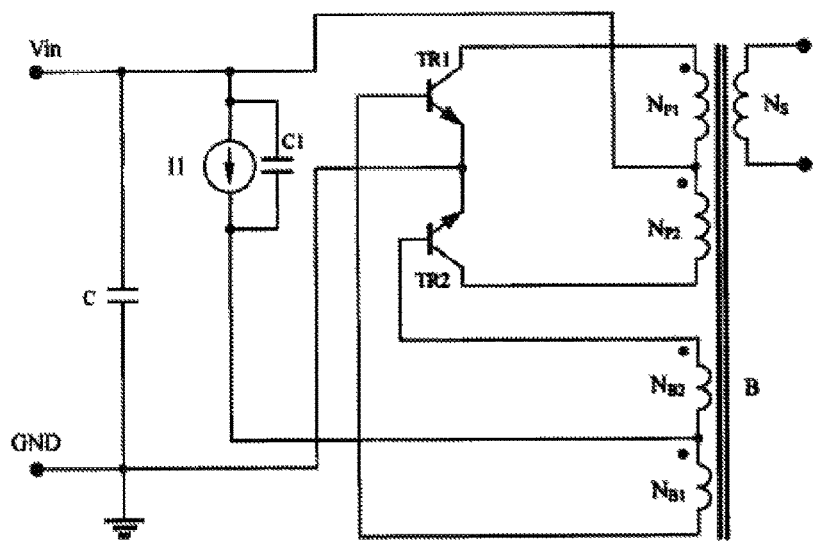
FIG. 19 is the circuit drawing of the first exemplary embodiment of the present invention.

FIG. 19 shows the circuit drawing of the first embodiment of the present invention, which differs from the prior art circuit shown in FIG. 1-1 in that a constant current source I1 is used instead of resistor R1. The main part of the circuit is the self-excited push-pull converter, and the working principle of the circuit is as follows.

The constant current source I1 replaces the original bias resistor R1 but the current direction remains the same. On an occasion when the operating voltage increases, the provided current for the bases of the two push-pull transistors TR1 and TR2 remains constant thanks to the constant current source. By observing and comparing the collector current of one of the transistors, it is found that the circuit enters into a new working mode of push-pull oscillation, which is forced by the fixed base current value. This is in sharp contrast to the prior art counterpart where under the same condition, the needed core saturation current rapidly increases with the increasing operating voltage, which leads to rising in no-load loss of the circuit and drop of conversion efficiency. The new working mode of push-pull oscillation will be described in the following.

Right after the power is turned on, constant current source I1 provides forward bias for the bases and emitters of transistors TR1 and TR2 via feedback windings NB1 and NB2, and then the two transistors are conducted. Because the properties of the two transistors cannot be totally the same, one of them will be conducted first. On the assumption that TR2 is firstly conducted and produces collector current, the corresponding coil winding NP2 would be positive in power supply end and negative in collector of TR2, i.e., positive in the upper position and negative in the lower position in the figure. According to the dotted terminal relationship, the base feedback winding NB2 also shows a positive feedback induced voltage which maintains and increases the base current of TR2. This positive feedback enables quick core saturation and conduction of TR2. At the same time, the induced voltage of corresponding base feedback winding NB1 (positive in the upper and negative in the lower in the figure) of TR1 decreases the base current of TR1 to cause TR1 to quickly and completely shut off. The reduced part of the base current of TR1 is the increased part of that of TR2.

The current of coil winding corresponding to TR2 and its magnetic induction show linear increase with time. Before the magnetic induction increasing to the core saturation point Bm of coupling transformer B, when the collector current of TR2 is close to the product of its base current and its amplification times, TR2 will be out of the saturation mode and enters into amplification mode. The voltage drop UCE between the collector and emitter of TR2 increases significantly, and accordingly the voltage between the two ends of coil winding NP2 (corresponding to TR2) decreases by the same degree and the induced voltage in the base feedback winding NB2 also decreases, thereby reducing the base current of TR2. This positive feedback enables TR2 to get out of the amplification mode quickly and enter into the cut-off mode. At the same time, the induced voltage in base feedback winding NB1 corresponding to TR1 helps to increase the base current of TR1. Consequently, TR1 is then conducted. The increase in base current of TR1 comes from the decrease in base current of TR2.

In this way, the two transistors are alternately conducted to complete the push-pull oscillation process. Because the total base input current is limited by the constant current source I1 and does not change with fluctuations in the operating voltage. When operating voltage elevates, the circuit enters into the new push-pull oscillation, rather than the core-saturation mode as in the prior art, and does not lead to an increased input current and increased no-load loss, thereby realizing the beneficiary effects of the present invention.

Figures 1, 2:
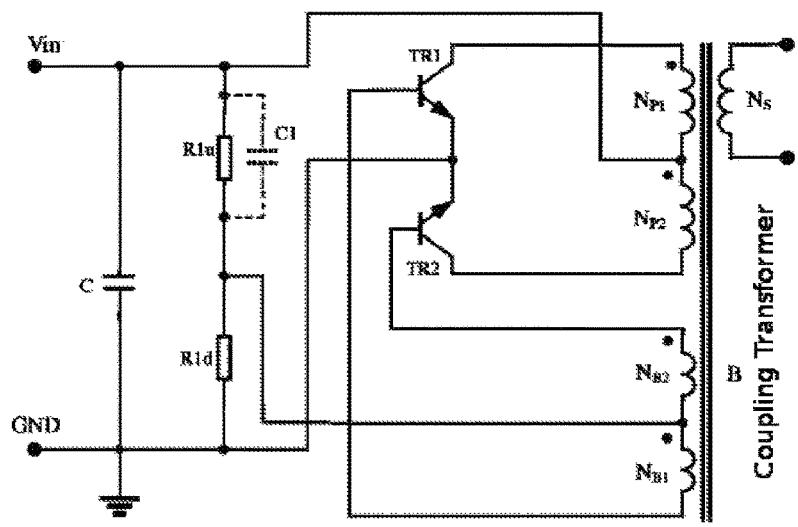
Figure 2:
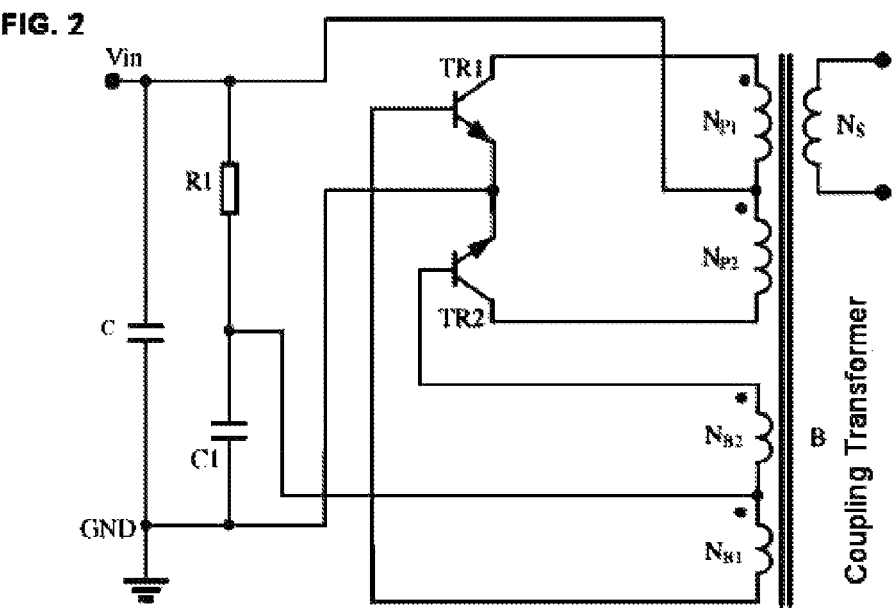
Figure 20:
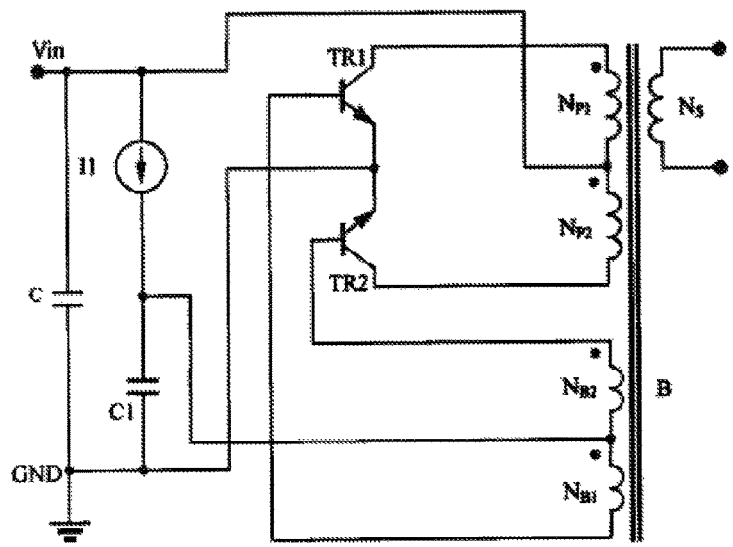
FIG. 20 is the circuit drawing of the second exemplary embodiment of the present invention.

FIG. 20 is the circuit drawing of the second embodiment of the present invention, improving the prior art counterpart shown in FIG. 2. It differs from the first one shown in FIG. 19 in that a capacitor C1 is connected between the constant current source (which is also connected to the center tap of feedback winding of transformer B) and the ground of input power. This embodiment can realize all the functions of the one in FIG. 19 plus a soft-start feature, because C1 is connected to the ground, there would be no impulse current against the bases and emitters of the transistors that would occur in the circuit of FIG. 19 when power is on. This embodiment can realize soft-starting because sudden voltage jumps cannot occur between the two ends of C1: the circuit enters into push-pull oscillation only when the terminal voltage of capacitor C1, charged by the constant current source, increases to a level sufficient to conduct TR1 and TR2.

The working principle of the second embodiment is the same as that of the first example and will not further described here to avoid redundancy.

Figure 3:
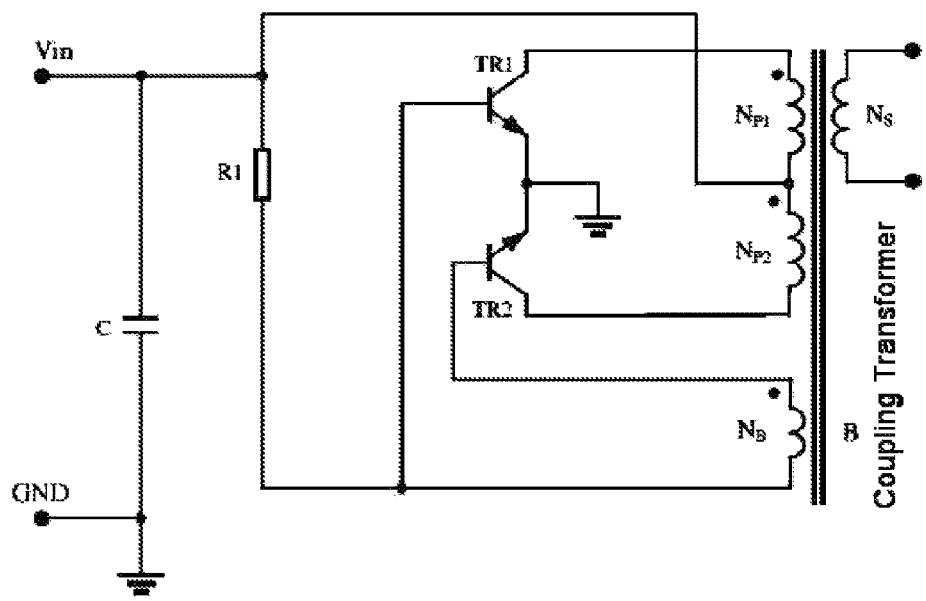
FIG. 3 is a Royer circuit with a simplified feedback winding.

FIG. 21 shows the third embodiment of the present invention, improving the prior art counterpart shown in FIG. 3. Between the bases and emitters of TR1 and TR2, there is a parallel connected low-voltage zener diode whose value is lower than the reverse voltage (generally 5V-7V) from the bases to emitters of triodes TR1 and TR2. The zener diode with less than 5.6V voltage is usually used. The cathode of this diode is connected with the base of triode TR1 or TR2, and the anode with the emitter of triode TR1 or TR2. The main purpose of this diode is to avoid reverse voltage caused by a single feedback winding to break through TR1 or TR2 from the base to the emitter.

If the zener diode is absent, the circuit would use the area from bases to emitters of TR1 and TR2 as an equivalent to a stabilivolt with 5V~7V voltage under the reverse breakdown state. The working principle of the third embodiment is further described in the following:

The constant current source I1 replaces the original bias resistor R1 while maintaining the same current direction. When the operating voltage of the self-excited push-pull converter in FIG. 21 goes up on occasions, the provided current for the bases of two push-pull switching transistors TRI and TR2 remains constant because of the constant current source. By observing and comparing the collector current of one of the transistors, it is found that in the prior art circuit the needed core saturation current rapidly goes up with the increasing operating voltage, which leads to rising in no-load loss of circuit and dropping in conversion efficiency, but in the circuit of the present invention, because the base current is set in a fixed value, the circuit goes into a new working mode to realize push-pull oscillation. The new oscillation mode is further described as follows:

Right after the power is turned on, constant current source I1 provides not only the power for the base of TR1, but also the forward bias for the base and emitter of the push-pull switching transistors via the feedback winding NB, and then the two transistors TR1 and TR2 are conducted due to the extremely low internal resistance (nearly 0). Because the electrical characteristics of TR1 and TR2 cannot be totally the same, one of them will be conducted first. On the assumption that triode TR2 is firstly conducted and produces collector current, the corresponding coil winding NP2 would be positive in power supply end and negative in collector of TR2, i.e. positive in the upper position and negative in the lower position as shown in FIG. 21. According to the dotted terminal relationship, the base feedback winding NB (positive in the upper and negative in the lower) also shows a positive feedback induced voltage which maintains and increases the base current of TR2. This positive feedback enables a quick saturation and conduction of triode TR2 and, at the same time, because the base of TR2 presents a voltage about 0.7V, that is, the upper end of feedback winding NB is clamped to 0.7V, while the induced voltage is positive in the upper and negative in the lower, the base voltage of TR1 must be lower than 0.7V to stop conduction, i.e., TR1 is quickly cut off. The reduced part in base current of TR1 becomes the increased part in that of TR2. If the induced voltage of feedback winding NB is or above 6V, the base and emitter of TR1 will be in reverse breakdown, which can be avoided by using the above described method with parallel connection of diodes.

The current of coil winding NP2 and its magnetic induction increase linearly with time. Before the magnetic induction increasing to the core saturation point Bm of coupling transformer B and when the collector current of TR2 is close to the product of its base current and its number of amplification times, TR2 will be out of saturation and enters into the amplification mode. The voltage drop UCE from the collector and emitter of TR2 increases significantly, and accordingly the voltages of two ends of coil winding NP2 decrease by the same degree. The correspondingly induced voltage in base feedback winding NB also decreases, which reduces the base current of TR2 and consequently leads to further decrease of collector current of TR2. This positive feedback enables TR2 to get out of amplification quickly and enter into the cut-off state. At the same time, the voltage reducing to the point of reversing the direction in the base feedback winding NB corresponding to TR1 helps increasing in the base current of TR1 and then TR1 is completely saturated and conducted. The increase of the base current of TR1 comes from the decrease of base current of TR2.

In this way, the two transistors are alternately conducted to complete the push-pull oscillation process. Because the total base input current is limited by constant current source I1 and does not change with fluctuations in the operating voltage, if the operating voltage elevates, the circuit enters into a new push-pull oscillation mode. Therefore, when the operating voltage increases, as it would not enter into the core saturation working mode, the operating current and no-load loss would not rapidly increase while the conversion efficiency increases, thereby achieving the beneficial effects of the present invention.

FIG. 22 is the fourth embodiment of the present invention. Compared with the third embodiment in FIG. 21, the constant current source has been divided into I1a and I1b to directly provide bias for each of the two transistors respectively, for overcoming the influence on the circuit by the internal resistance of feedback winding NB in FIG. 21. Its working principle is basically the same as that of the third implemented example and thus needs no further description.

Figures 4, 24:
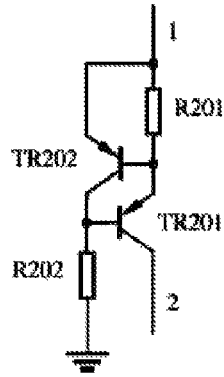
Figures 5, 24:
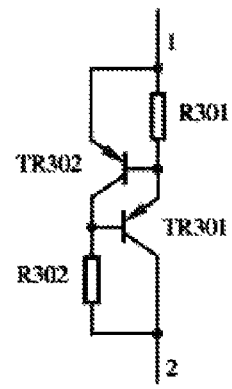

In the embodiments described above, the constant current source is represented by the same symbol shown in FIG. 23. In practice, however, it can take different forms, which are all well-known in the art:

FIG. 24-1 uses a current regulative diode to achieve a constant current source, where pins 1 and 2 are corresponding to pins 1 and 2 in FIG. 23. The current regulative diode is abbreviated as CRD.

FIG. 24-2 uses a junction field effect transistor, which is abbreviated as JFET, to achieve a constant current source, where pins 1 and 2 are corresponding to pins 1 and 2 in FIG. 23. A P-channel may also used here to make a constant current source circuit.

In FIG. 24-3, the constant current source is achieved with a JFET, where the value of the constant current can be easily set by adjusting the value of resistor R. A P-channel may also used here to make a constant current source circuit.

Figure 4:
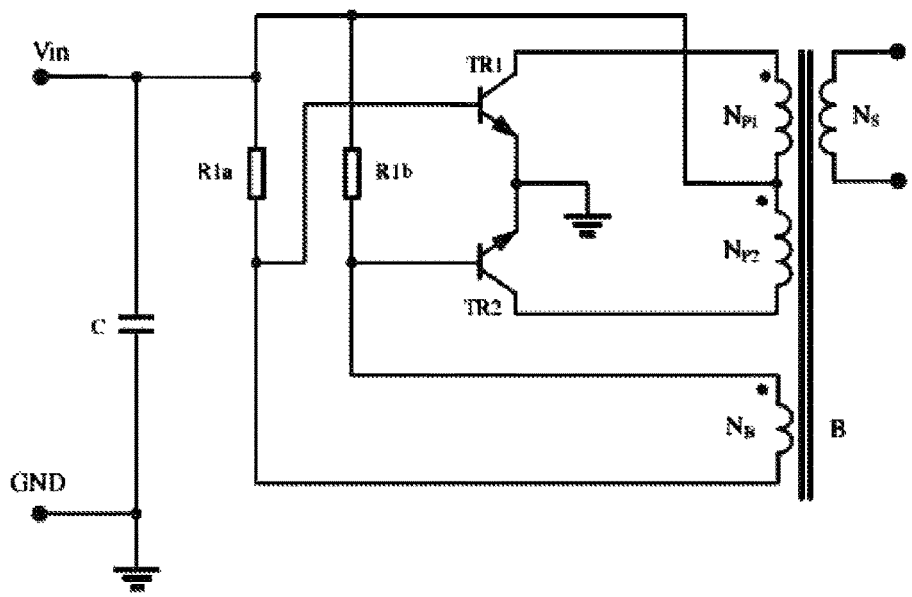
FIG. 4 is the original form from which the FIG. 3 circuit is derived with a simplified feedback winding.

In FIG. 24-4, the constant current source is achieved by connecting two PNP transistors. The circuit is a classic one with the output current calculated as:

$$Io = \frac{U_{BE}}{R_{201}} \quad \text{Formula 3}$$

In this formula, Io stands for the output current of pin 2 in FIG. 24-4, $U_{BE}$ is the voltage drop of the base and emitter of TR202. The voltage value for silicon tube is usually about 0.6V, and $R_{201}$ means the resistance of the resistor R201. This circuit can also be implemented with NPN transistors. As shown FIG. 25, the second embodiment uses this implementation for the constant current source.

Figure 5:
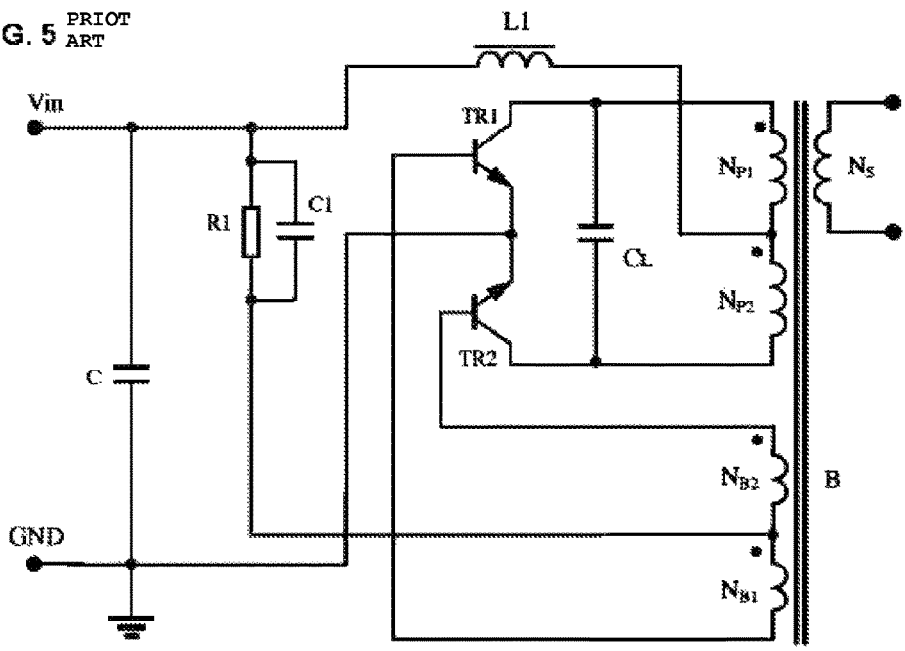
FIG. 5 is a Royer circuit producing a output waveform close to the sine wave.
Figure 9:
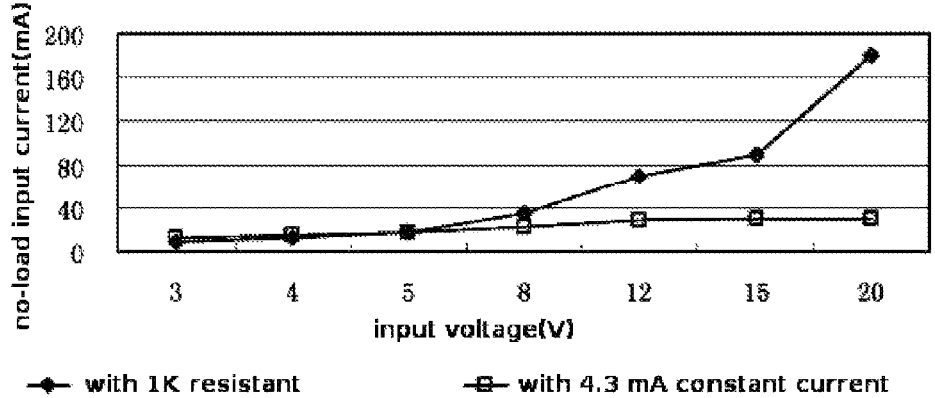
FIG. 9 shows the no-load input current comparison of a 5V-5V Royer circuit under different bias modes.
Figure 10:
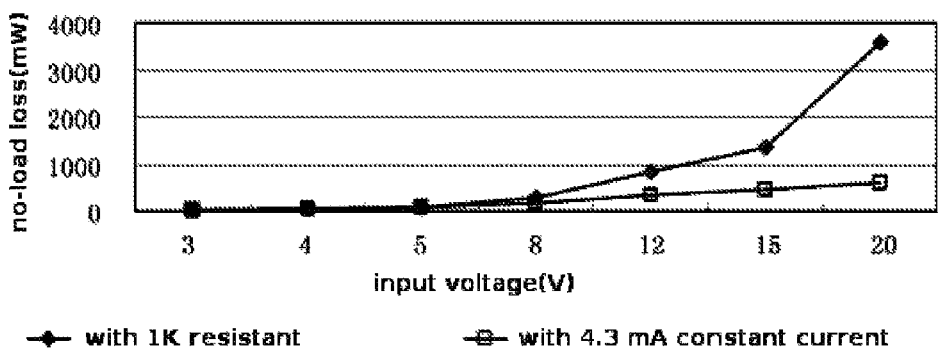
FIG. 10 shows the no-load loss comparison of a 5V-5V Royer circuit under different bias modes.
Figure 11:
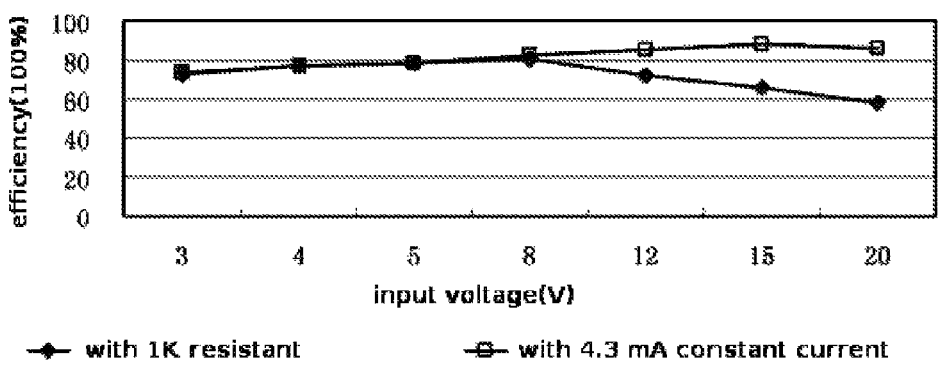
FIG. 11 shows the conversion efficiency comparison of a 5V-5V Royer circuit under different bias modes.
Figure 15:
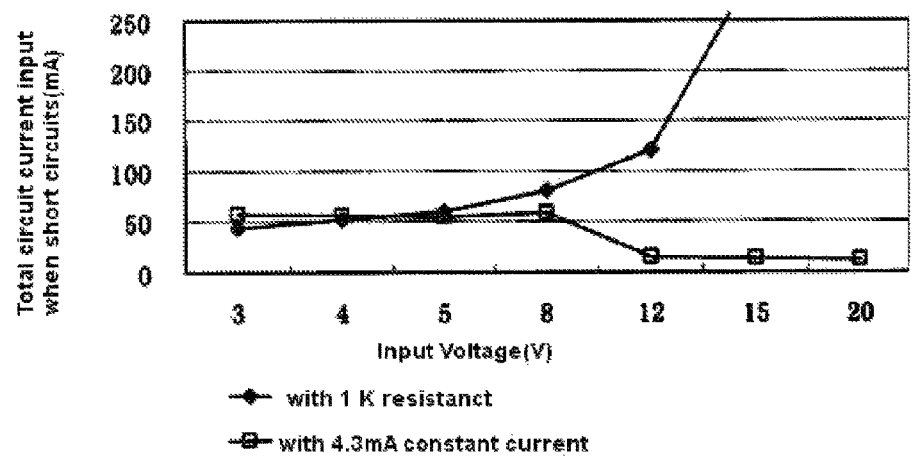
FIG. 15 shows the comparison of total input current upon load short-circuit of a 5V-5V Jensen circuit under different bias modes.
Figure 16:
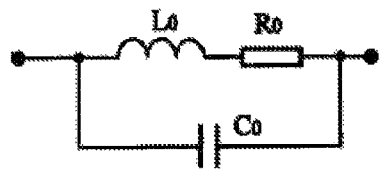
FIG. 16 is a well-known schematic diagram showing a circuit with an effect equivalent to inductance.
Figure 17:
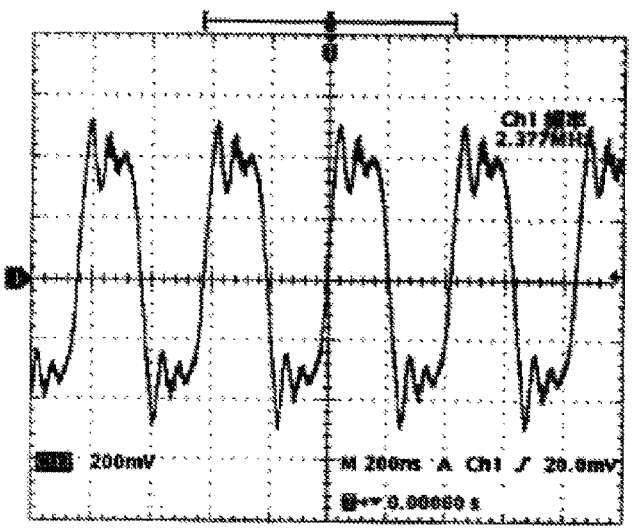
FIG. 17 shows the high frequency oscillation waveform measured in the transformer of the present invention when the load short-circuits.
Figure 18:
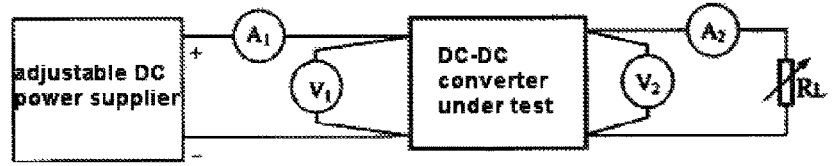
FIG. 18 is the schematic diagram for the tests described in this application.

Shown in FIG. 24-5, when the amplification of TR301 and TR302 is high, R302 can be set to a larger value to optimize the circuit as a two-terminal component for convenience in use. Although it provides an effect of constant current which is not as good as the one in FIG. 24-4, it can generally meet the requirements in practice.

Figures 6, 24:
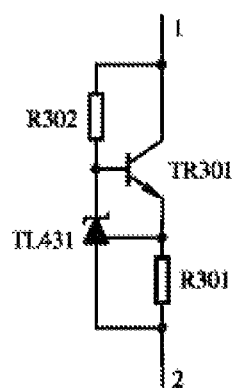

FIG. 24-6 is a schematic diagram of a constant current source constructed by a TL431 precision adjustable reference IC. Other precision adjustable reference ICs may also be used instead. Taking TL432 as the example, the output current is calculated as:

$$Io = \frac{U_{REF}}{R_{301}} \quad \text{Formula 4}$$

In the formula, Io stands for the output current of pin2 in FIG. 24-6; $V_{REF}$ is the reference voltage of precision adjustable reference IC, which is usually 2.50V, 2.495V or 1.25V; $R_{301}$ means the resistance of the resistor R301.

Figures 7, 24:
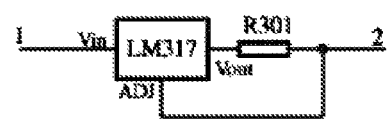

FIG. 24-7 is a schematic diagram of a constant current source constructed by an LM317 voltage regulator IC. Other linear voltage regulator ICs may also be used to achieve the same purpose. The output current is calculated as:

$$Io = \frac{1.20 \text{ V}}{R_{301}} \quad \text{Formula 5}$$

In Formula 5, Io stands for the output current of pin2 in FIG. 24-7; 1.20V is the reference voltage of LM317 (before dropping into 1.20V, the original value is 1.25V); $R_{301}$ represents the resistance value of resistor R301.

Although FIGS. 24-1 to 24-7 showed seven exemplary circuits to achieve the constant current source in FIG. 23. Other circuits may also provide satisfactory results when used as DC bias in the self-excited push-pull converter of the present invention, and shall be regarded as within the protection scope of the present invention.

Figure 25:
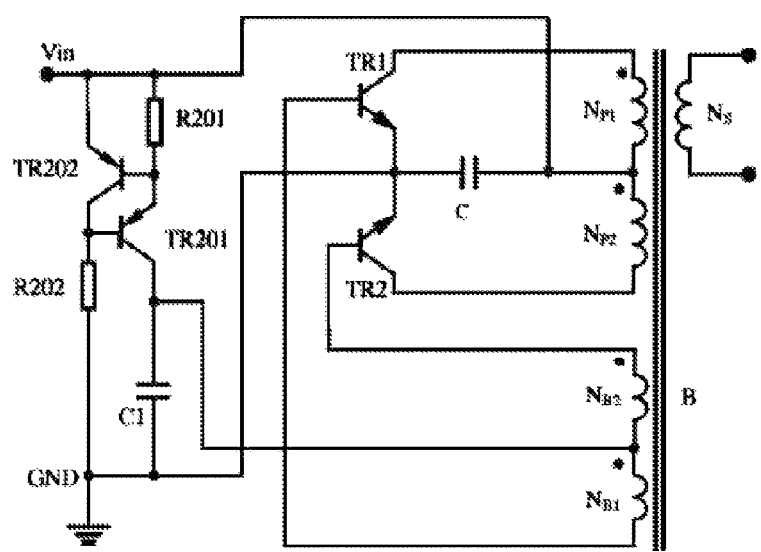
FIG. 25 is the circuit schematic diagram of the fifth exemplary embodiment of the present invention, which is based on the second embodiment but with the constant current source replaced with the one shown in FIG. 24-4.

FIG. 25 is the fifth embodiment of the present invention, which uses the constant current source circuit of FIG. 24-4. As shown in FIG. 25, the working principles are the same as embodiment 2 except for the constant current source circuit.

Figure 26:
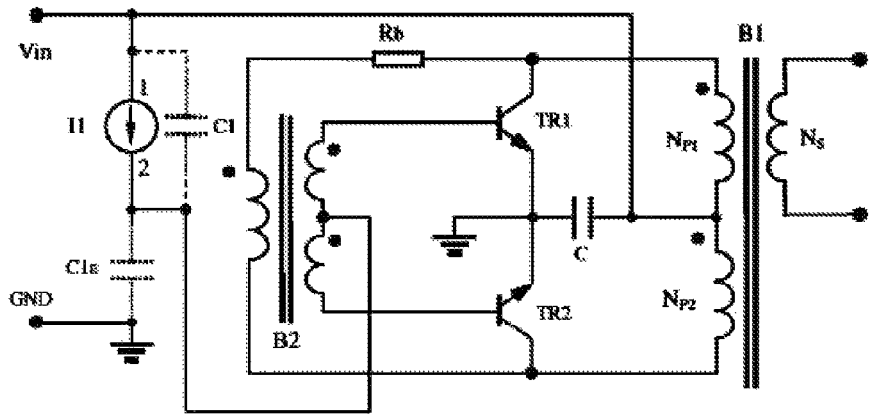
FIG. 26 is the schematic diagram of the sixth exemplary embodiment of the present invention.

FIG. 26 is the sixth embodiment of the present invention, using the classic Jensen circuit as the main part of the circuit. In this example, the bias circuit has been replaced with a constant current source, the working principle of which is similar to that of the first embodiment. The main transformer B1 and transformer B2 are parallel connected through resistor Rb. The bases of TR1 and TR2 can also have positive feedback signals to realize push-pull oscillation. Similarly, when the operating voltage of the Jensen circuit increases, the base current of its transistors would increase and so would be the collector current. However, because of the constant current source I1, the current provided for the bases of two push-pull transistors TR1 and TR2 is constant. Thus, when the input voltage increases, the circuit also produces the beneficial effects similar to those of Table 4.

Figure 27:
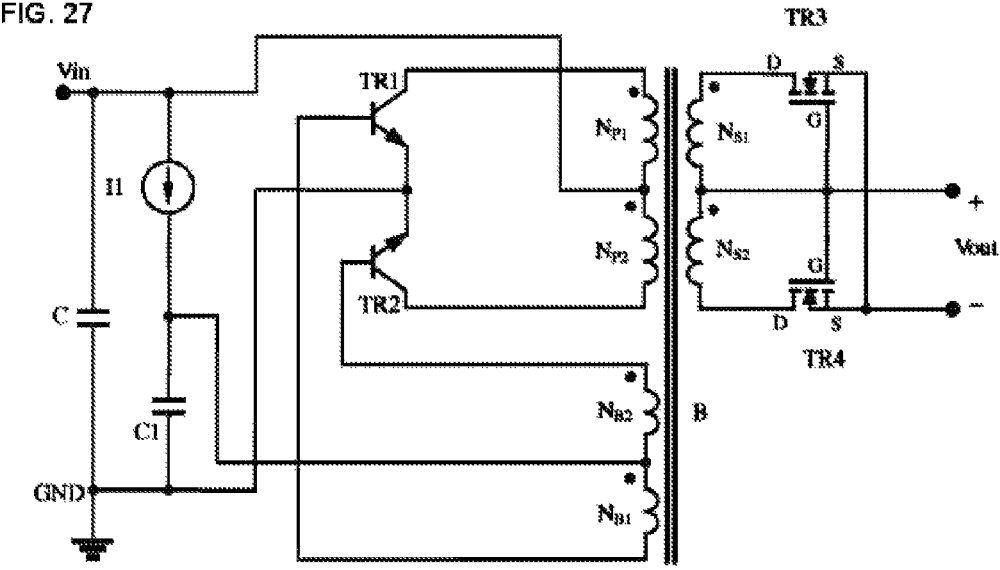
FIG. 27 is the schematic diagram of the seventh exemplary embodiment of the present invention.

FIG. 27 is the seventh embodiment of the present invention where the output uses a synchronous rectification circuit known in the art. The working principle is the same as that of the second embodiment. It can achieve the linear synchronization both between output and input voltages and of isolated voltages in a wider input voltage range.

The synchronous rectification circuit in FIG. 27 is a basic self-driven circuit. In practical application, the signals of gate of driving synchronous rectification field-effect transistor could be from other separate windings or circuits. In addition, commonly used technical methods such as adding a capacitance in the gate of synchronous rectification field-effect transistor or increasing resistance division network can also be used to protect the gate of the synchronous rectification field-effect transistor.

The above represents the preferred embodiments of the present invention. It should be noted that the preferred embodiments should not be considered restrictive, and the scope of the invention should be defined by the claims. People of ordinary skill in the art may make improvements and modifications without departing the spirit and scope of the invention, and those improvements and modifications should also be considered as within the scope of the invention. For example, the transistor may be replaced with transistor complex, PNP transistor with NPN transistor, and the polarity of power input voltage may be reversed, etc.

What is claimed is:

1. A method of producing a self-excited push-pull oscillation in a converter comprising providing a constant current source between bases of push-pull transistors and an effective power supply end so that combined base current of said transistors is limited and remains constant in an event when operating voltage fluctuates.

2. The method according to claim 1, wherein said push-pull transistors are of an NPN type and said constant current source provide a current in a direction from said constant current source to the bases of said NPN transistors.

3. The method according to claim 2, wherein said constant current source is in a parallel connection to provide a large constant current.

4. The method according to claim 1, wherein said push-pull transistors are of PNP type and said constant current source provides a current in a direction from the bases of the PNP transistors to said constant current source.

5. The method according to claim 4, wherein said constant current source is in a parallel connection to provide a large constant current.

6. The method according to claim 1, wherein said constant current source is in a parallel connection to provide a large constant current.

7. The method according to claim 1, wherein said constant current source is implemented with a semiconductor device or a current circuit.

8. The method according to claim 1, further comprising providing a synchronous rectifier circuit at output end of said converter to realize linear synchronous between output and input voltages of said converter.

9. The method according to claim 1, wherein said constant current source is implemented with a current regulative diode, a junction field effect transistor, a TL431 precision adjustable reference IC, or an LM317 voltage regulator IC.

10. The method according to claim 1, wherein said constant current source comprises more than one transistors.

11. A self-excited push-pull converter, comprising an input end, an output end, a transformer, a pair of push-pull switching transistors each of which has a base, and a constant current source located between said input end and said base of said transistors.

12. The self-excited push-pull converter according to claim 11, wherein said transistors are of a NPN type and said constant current source provides a current in a direction from said constant current source to said base of said NPN transistors.

13. The self-excited push-pull converter according to claim 12, wherein said output end is a synchronous rectifier circuit.

14. The self-excited push-pull converter according to claim 11, wherein said output end is a synchronous rectifier circuit.

15. The self-excited push-pull converter according to claim 11, wherein said transistors are of a PNP type and said constant current source provides a current in a direction from said base of said PNP transistors to said constant current source.

16. The self-excited push-pull converter according to claim 15, wherein said output end is a synchronous rectifier circuit.

17. The self-excited push-pull converter according to claim 11, wherein said constant current source comprises a current regulative diode, a junction field effect transistor, a TL431 precision adjustable reference IC, or an LM317 voltage regulator IC.

18. The self-excited push-pull converter according to claim 11, wherein said constant current source comprises more than one transistors.

* * * * *